(12) United States Patent
Yoshihama et al.

(10) Patent No.: US 6,955,626 B2
(45) Date of Patent: Oct. 18, 2005

(54) DIFFERENTIAL GEARING UNIT FOR VEHICLE

(75) Inventors: Tomoki Yoshihama, Saitama-ken (JP); Takashi Takizawa, Saitama-ken (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/602,950

(22) Filed: Jun. 24, 2003

(65) Prior Publication Data

US 2004/0033859 A1 Feb. 19, 2004

(30) Foreign Application Priority Data

Aug. 19, 2002 (JP) ........................................ 2002-238177

(51) Int. Cl.[7] .............................................. F16H 48/10
(52) U.S. Cl. ...................................................... 475/248
(58) Field of Search ............................... 475/248, 249, 475/250, 253, 300, 303, 299, 317

(56) References Cited

U.S. PATENT DOCUMENTS

| | | | | | |
|---|---|---|---|---|---|
| 3,590,660 | A | * | 7/1971 | Bopp | 475/300 |
| 3,915,031 | A | * | 10/1975 | Hanson | 475/249 |
| 4,677,875 | A | * | 7/1987 | Batchelor | 475/249 |
| 4,704,921 | A | * | 11/1987 | Fry | 475/249 |
| 4,774,854 | A | * | 10/1988 | Ida | 475/249 |
| 4,873,892 | A | * | 10/1989 | Ohkubo | 475/250 |
| 4,943,267 | A | * | 7/1990 | Sugden | 475/248 |
| 5,527,229 | A | * | 6/1996 | Ishihara et al. | 475/249 |
| 5,584,202 | A | * | 12/1996 | Kanamaru et al. | 72/105 |
| 6,085,880 | A | * | 7/2000 | Kuhn et al. | 475/317 |

FOREIGN PATENT DOCUMENTS

| | | |
|---|---|---|
| JP | 5-187487 | 7/1993 |
| JP | 9-280338 | 10/1997 |

* cited by examiner

*Primary Examiner*—Sherry Estremsky
(74) *Attorney, Agent, or Firm*—Flynn, Thiel, Boutell & Tanis, P.C.

(57) ABSTRACT

A sun gear 6 is concentrically, rotatably disposed inside an internal gear 4. Plural planet gears 8, carried by a planetary carrier 10, are disposed between and in meshing engagement with the internal gear 4 and the sun gear 6. The planetary carrier 10 is connected to a shaft extending from an engine while the internal gear 4 and the sun gear 6 are connected to output shafts. The internal gear 4 is molded by a plastic working, followed by a thermal treatment including soft-nitriding, a nitriding and a carburizing hardening step. The inner surface of the internal gear 4 is formed with internal gear teeth 4b, except for an axial portion 4d, while a spline groove 4a is formed on the outer surface of the internal gear 4 at a location corresponding to the portion 4d where no internal teeth 4b are formed for engagement with a spline 2a on a housing 2. The internal gear 4 is reduced in size while improving the mechanical strength thereof.

4 Claims, 4 Drawing Sheets

DIFFERENTIAL GEARING UNIT FOR VEHICLE

BACKGROUND OF THE INVENTION AND RELATED ART STATEMENT

The present invention relates to a differential gearing unit for a vehicle, and in particular, to such a differential gearing unit including a torque responsive differential limiting function.

A differential gearing unit for a vehicle comprising an internal gear having internal teeth formed around an inner peripheral surface thereof, a sun gear disposed inside the internal gear concentrically therewith, a plurality of planet gears disposed between the internal gear and the sun gear in meshing engagement with both gears, and a planetary carrier for carrying the planet gears for revolution around the axis of rotation of the internal gear and the sun gear while allowing each of the planet gears to revolve on its own axis and constructed such that the planetary carrier is connected to a shaft which transmits a drive from an engine while the internal gear and the sun gear are connected to front and rear wheels of a four-wheel drive vehicle is known in the art.

FIG. 5 shows an example of a differential gearing unit for a vehicle as mentioned above, which is disclosed in Japanese Patent Application No. 2001-244,146 filed by the present applicant. Describing the construction of this prior art differential gearing unit with reference to FIG. 5, a housing 102 (102A, 102B) contains an internal gear 104 and a sun gear 106 disposed concentrically inside the internal gear 104. A plurality of planet gears 108 carried by a planetary carrier 110 are disposed between the internal gear 104 and the sun gear 106 in meshing engagement with both gears 104 and 106. In this example, all of the internal gear 104, the sun gear 106 and the planet gears 108 have twisted gear teeth which are in meshing engagement with each other. The planetary carrier 110 is secured to the housing 102 by bolts 112 for integral rotation.

The internal gear 104 includes a cylindrical portion 104e and a flange 104f which extends radially inward from one end (right end as viewed in FIG. 5) of the cylindrical portion 104e. Internal gear teeth 104b are formed on the inner peripheral surface of the cylindrical portion 104e while a spline groove 104a is formed in the inner peripheral surface of the flange 104f. A spline groove 122a formed around the outer periphery of an output member 122 fits in the spline groove 104a of the flange 104f.

In the differential gearing unit for a vehicle as mentioned above, a spline groove formed in a shaft which transmits a drive from an engine may be engaged with a spline groove 110a formed around the inner periphery of the planetary carrier 110, for example, and one of front and rear wheels of a four-wheel drive vehicle may be connected to a spline groove 122b formed around the inner periphery of the output member 122 which is splined to the internal gear 104 while the other wheels may be connected to a spline groove 106b formed around the inner periphery of the sun gear 106.

With the differential gearing unit for a vehicle mentioned above, when a drive from the engine is transmitted and the vehicle is running straightforward on an even road, the carrier 110 which carries the planet gear 108 is driven for rotation, and there is no relative rotation between the planet gears 108 which are carried by the carrier 115 on the one hand and the internal gear 104 and the sun gear 106 which mesh therewith on the other hand, resulting in an integral rotation. When the vehicle is turning around a corner of the road, the revolution of the planet gears 108 carried by the carrier 110 on their own axes provides for a differential rotation between the front and the rear drive wheels which are connected to the internal gear 104 and the sun gear 106, respectively. When there is a difference in the coefficient of friction which the front and the rear wheels experience from the road surface to produce a difference in the grip between the front and the rear drive wheels, an axial thrust which results from a reaction to the rotation of the meshing twisted gear teeth and frictional forces which are developed at the abutting surfaces between the carrier 110 and the planet gears 108 provide a torque distribution or a differential limiting function.

A conventional internal gear 104 which is assembled into the differential gearing unit for a vehicle as mentioned above has internal gear teeth 104b which are formed by a cutting operation. This requires the provision of a work grinding undercut when machining an innermost portion (a portion indicated by character A in FIG. 5) of the internal gear teeth 104b, presenting a problem that the axial length is increased and another problem that a mechanical strength may become wanting because of a reduced thickness of this portion.

OBJECT AND SUMMARY OF THE INVENTION

Accordingly, it is an object of the present invention to provide a differential gearing unit for a vehicle which dispenses with the provision of a work grinding undercut when forming the gear teeth, thus allowing the internal gear to be formed in a small size.

It is another object of the invention to provide a differential gearing unit for a vehicle having an internal gear of an increased mechanical strength.

Above objects are accomplished by the provision of an internal gear, a sun gear disposed concentrically inside the internal gear, planet gears disposed between the internal gear and the sun gear in meshing engagement with both gears to transmit a torque, and a planetary carrier for carrying the planet gears so as to be capable of revolving around the sun gear and on their own axes and by forming the internal gear by a plastic working in a manner such that the internal gear teeth around the inner peripheral surface of the internal gear and a spline groove formed in the outer peripheral surface thereof are axially displaced from each other.

With the differential gearing unit for a vehicle according to the present invention, the internal gear is formed by a plastic working and thus dispenses with the provision of a work grinding undercut as occurs in a conventional internal gear which is formed by a cutting operation, thus allowing the axial length to be reduced, and the work hardening which occurs during the plastic working improves the mechanical strength. Since the internal gear teeth which are formed around the inner peripheral surface are axially displaced from the spline which is formed in the outer peripheral surface, a sufficient strength can be assured in the region of the gear teeth.

DETAILED DESCRIPTION OF PREFERRED EMBODIMENT

Figure 1:
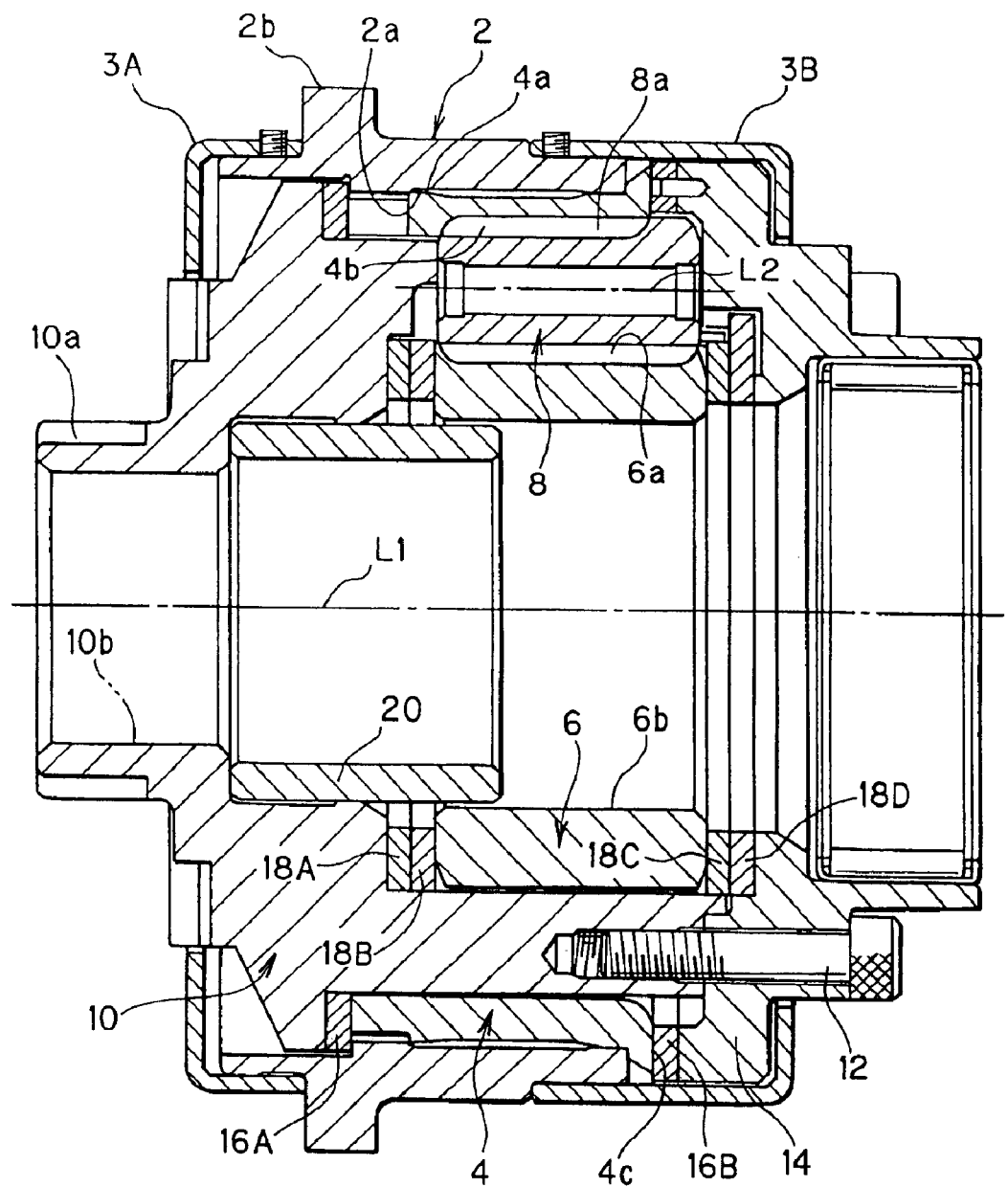
FIG. 1 is a longitudinal section of a differential gearing unit for a vehicle according to one embodiment of the invention as cut by a plane including the axis of the gearing unit.

Referring to the drawings, one embodiment of the present invention will now be described. FIG. 1 is a longitudinal section of a differential gearing unit for a vehicle according to one embodiment of the present invention. Covers 3A, 3B are secured to axially opposite sides of a cylindrical housing 2 to define an enclosure in which a planetary gear mechanism comprising an internal gear 4, a sun gear 6 and planet gears 8 is contained. A spline groove 2a is formed in the internal surface of the housing (output member), and is engaged by a spline groove 4a formed around the outer peripheral surface of the internal gear 4 for integral rotation.

The sun gear 6 is disposed inside the internal gear 4 for rotation about the same axis as an axis of rotation L1 of the internal gear 4. A plurality of planet gears 8 carried by a planetary carrier 10 are disposed between the internal gear 4 and the sun gear 6. The planet gears 8 are received in a plurality of receiving spaces formed in the planetary carrier 10 and spaced from each other in the circumferential direction of the carrier 10 with the tooth tip disposed in sliding contact with the internal surface of the receiving space. The planetary carrier 10 rotates about the axis of rotation L1, and as the planetary carrier 10 revolves about the axis L1, the center axes L2 of the individual planet gears 8 carried by the planetary carrier 10 revolve about the axis of rotation L1 of the planet carrier 10 and each planet gear 8 revolves on its own axis L2 within the respective receiving space in the planetary carrier 10. All of the planet gears 8, the internal gear 4 and the sun gear 6 have twisted gear teeth 8a, 4b and 6a, and each planet gear 8 meshes with the internal gear 4 which is located on the outer side and with the sun gear 6 which is located on the inner side.

A case 14 is fastened through bolts 12 to the end face of the planetary carrier 10 on the side on which the planet gears 8 are carried, and the outer periphery of the surface of the case 14 which faces the planetary carrier 10 (or the left-side surface as viewed in FIG. 1) is disposed in opposing relationship with an enlarged end face 4c of the internal gear 4, and the inner periphery of the same surface of the case 14 is disposed in opposing relationship with the end face of the sun gear 6. Washers 16A, 16B which receive thrusts developed during the relative rotation with respect to the planet gears 8 are disposed between one of the axial end faces (or the left end as viewed in FIG. 1) of the internal gear 4 and the planetary carrier 10 and between the enlarged end face 4c and the case 14. Also, washers 18A, 18B, 18C and 18D which receive thrusts developed during the relative rotation with respect to the planet gears 8 are disposed between one of the axial end faces of the sun gear 6 and the planetary gear 10 and between the other end face of the sun gear 6 and the case 14. In addition, a spacer 20 is disposed radially inward of the planetary carrier 10 and the sun gear 6.

A spline groove 10a is formed in the outer peripheral surface of the portion of the planetary carrier 10 which projects externally of the cover 3A (or the left portion as viewed in FIG. 1) and in this embodiment, the spline groove 10a is engaged by a spline groove which is formed in a shaft, not shown, extending from an engine, for transmitting a drive to the differential gearing unit. It is to be noted that a spline groove may alternatively be formed in the inner surface 10b of the planetary carrier 10 for connection with a shaft extending from the engine.

It is to be noted that a gear 2b is formed on the external surface of the housing 2 to which the internal gear 4 is splined, whereby the internal gear 4 is connected to one of front or rear wheels of a four-wheel drive vehicle, for example, through the gear 2b. A spline groove 6b is formed in the inner surface of the sun gear 6 and is connected to the other of the front and rear wheels.

When a drive from the engine is transmitted to the differential gearing unit to rotate the planetary carrier 10, the internal gear 4 and the sun gear 6 revolve about the axis of rotation L1 through the planet gears 8 which are carried by the planetary carrier 10. It will be seen that because the pitch circle of the internal gear 4, which represents the point of action, has a greater diameter than the center diameter of the planet gear 8 representing the point of force when rotating the internal gear 4 through the planet gears 8 (or a distance between the axis of rotation L1 and the center axis L2 of the planet gear 8), it is a general practice that the internal gear 4 be engaged with a shaft which requires a higher torque. In addition, because the pitch circle of the sun gear 6 representing the point of action has a smaller diameter than the center diameter of the planet gear 8 representing the points of force, it is a general practice that the sun gear 6 be connected to a lower torque axle. For example, when the differential gearing unit for a vehicle according to the present embodiment is used as a center differential unit, and if the gear 2b located around the housing 2 which is connected to the internal gear 4 is connected to a rear axle while the sun gear 6 is connected to a front axle, there is obtained a vehicle having a characteristic which provides a greater torque for the rear wheels than for the front wheels.

Figure 2:
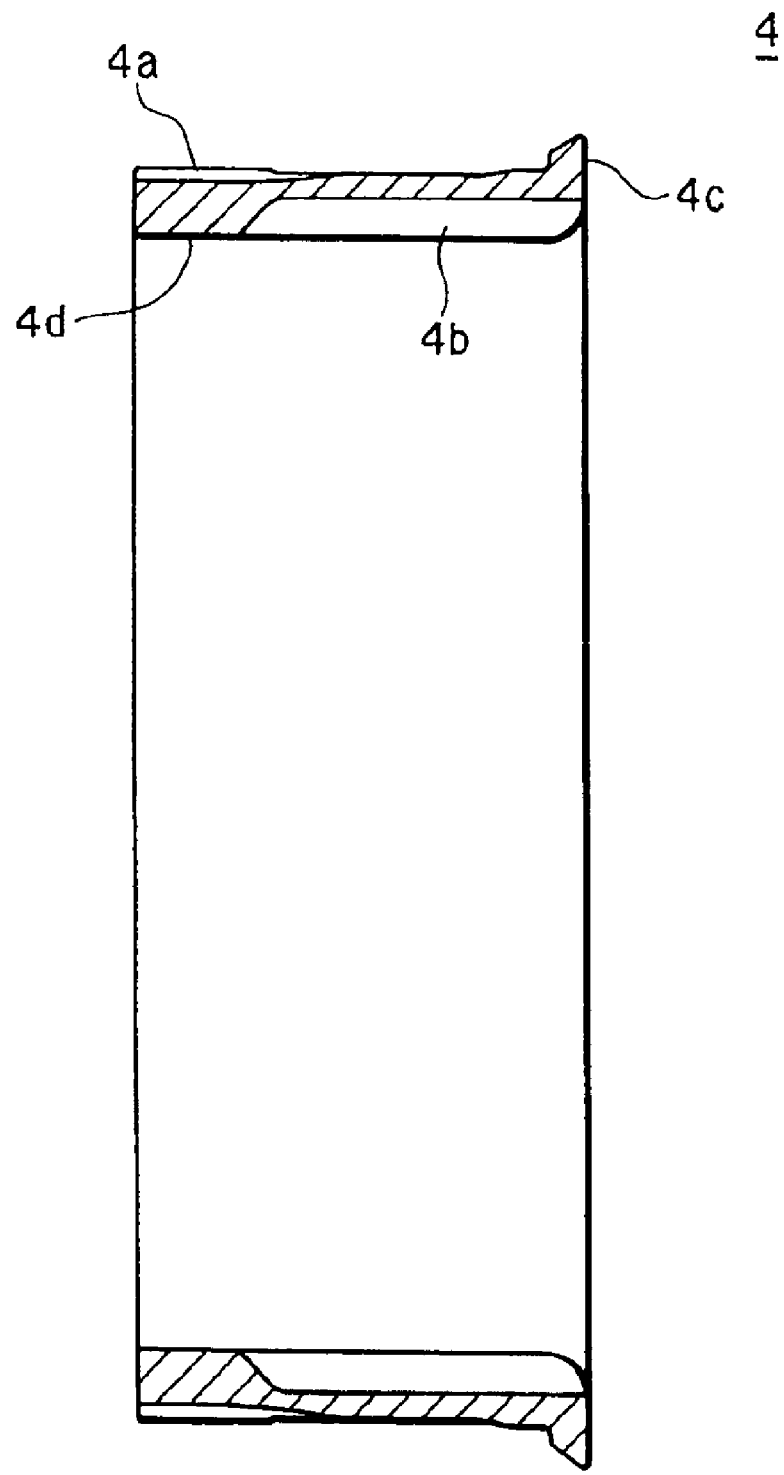
FIG. 2 is a longitudinal section of one example of the internal gear which is used in the differential gearing unit.

The internal gear 4 used in the present embodiment is molded by a plastic working, and is configured as shown in FIG. 2. Specifically, the internal gear 4 is substantially cylindrical in its general configuration, and an internal gear tooth 4b comprising a twisted gear tooth is formed on the inner peripheral surface except for a portion 4d, and the spline groove 4a is formed on the outer peripheral surface of the internal gear 4 in a region which corresponds to the portion 4d of the inner peripheral surface where the internal tooth 4b is not formed for engagement with the spline groove 2a formed in the inner surface of the housing 2. The internal gear 4 has an end face 4c on the side where the internal tooth 4b is formed (the right end face as viewed in FIGS. 1 and 2) which extends radially outward so as to be disposed in abutment against the washer 16B which is disposed between the internal gear 4 and the case 14. The plastic working method which forms the internal gear 4 is not limited to any specific technique, but in the present embodiment, the internal gear is molded by a forming process, followed by a thermal treatment including softnitriding, nitriding and carburizing hardening steps.

Figure 3:
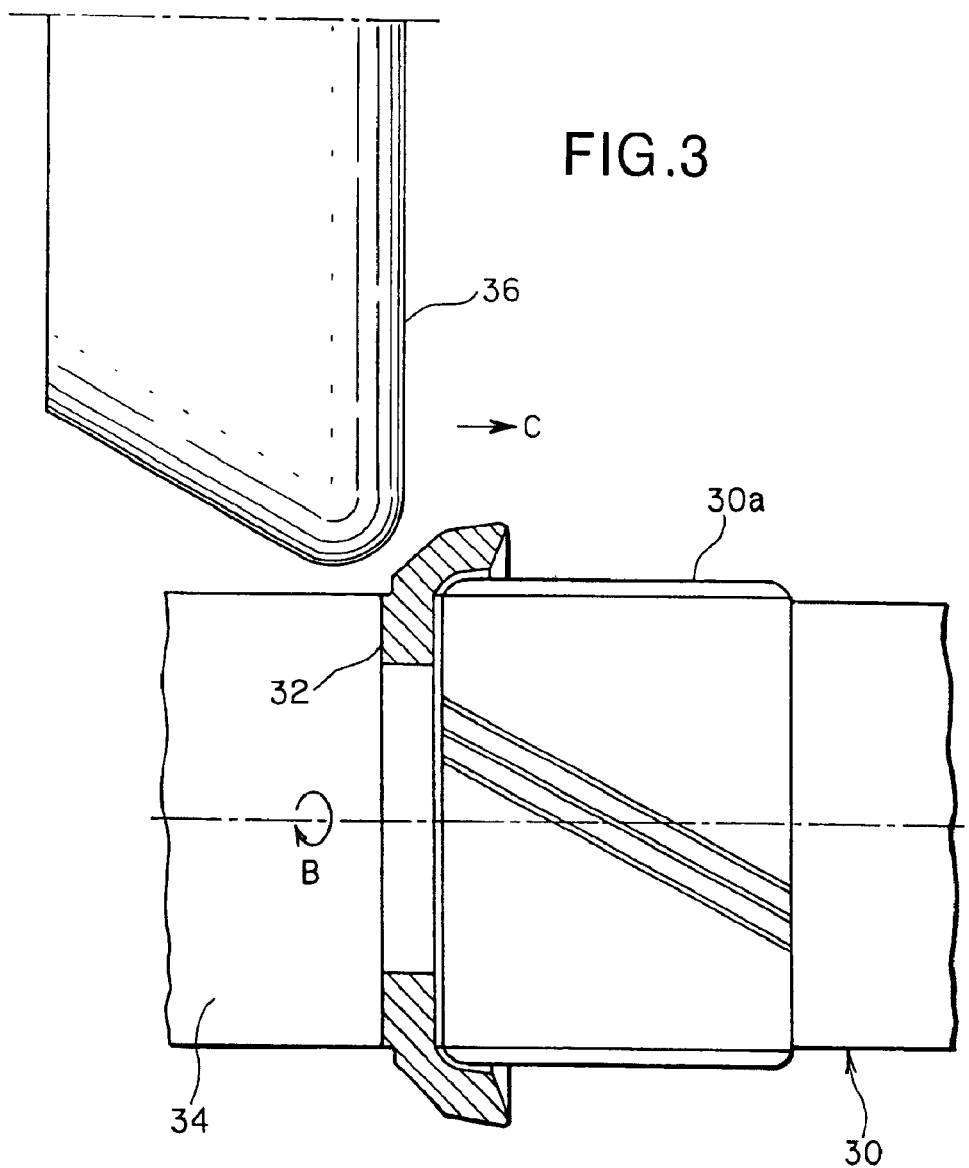
FIG. 3 is a schematic illustration of an exemplary technique of molding the internal gear by the plastic working.

An example of the technique for molding the internal gear 4 by a plastic working will now be described briefly with reference to FIG. 3. A forming die 30 is provided which is circular in section and in the form of a shaft and having external gear teeth 30a having the same twist angle as the internal gear teeth 4b of the internal gear 4 to be molded on its outer peripheral surface. A bottomed member 32 which is generally tubular is fitted over the forming die 30, and the member 32 is held sandwiched between a pressing die 34 which is circular in section and in the form of a shaft and the forming die 30 (a condition illustrated in FIG. 3), and while rotating the forming die 30, the member 32 and the pressing die 34 (in a direction indicated by an arrow B), a forming roll 36 is moved in the axial direction of the forming die 30 (indicated by an arrow C), thus pressing the inner peripheral surface of the member 32 against the external teeth 30a of the forming die 30 to form internal teeth 4b around the inner peripheral surface of the member 32. It is to be noted that the molding technique illustrated in FIG. 3 is only exemplary and the plastic working method used according to the present invention is not limited to the illustrated process.

Assuming that the gear 2b on the housing 2 which is engaged with the internal gear 4 and the spline 6b of the sun gear 6 are connected to one and the other of the front and rear wheels of a four-wheel drive vehicle, the operation of the differential gearing unit for a vehicle constructed in the manner mentioned above will now be described. When the vehicle is running straightforward on a normal flat road, the front and rear drive wheels are rotating in the same manner, and accordingly, the internal gear 4, the planet gears 8 and the sun gear 6 remain in meshing relationship with each other without producing any relative rotation, and the entire differential gearing unit revolves about the axis of rotation L1 in an integral manner.

When a differential rotation occurs between the front and rear drive wheels as when the vehicle is turning the corner, the differential rotation is compensated for by the planet gears 8 carried by the planet carrier 10 which revolve about the axis of rotation L1 while revolving about their own center axes L2. In other words, the differential function is achieved by the revolution of the planet gears 8 on their own axis in response to the differential rotation of the front and the rear drive wheels which causes one of the internal gear 4 and the sun gear 6 connected to the drive wheels to accelerate while decelerating the other.

If there occurs a difference in the grip between the front and the rear wheels as when a four-wheel drive vehicle is running on a bad road, the differential gearing unit provides a torque distribution. Specifically, the frictional forces which are developed by the meshing engagement between the gears 4, 6 and 8 act to reduce the torque imparted to the idling drive wheel while transmitting the saved torque to the other drive wheel having a higher traction, thus providing a torque distribution function or a differential limiting function. More specifically, if one of the drive wheels slips, the planet gears 8 which mesh with the internal gear 4 and the sun gear 6 revolve on their own axes. All of the internal gear 4, the sun gear 6 and the planet gears 8 have twisted gear teeth, and accordingly, a relative rotation therebetween produces a reaction to the rotation of other gears, thereby producing an axial thrust and frictional forces to the abutting surfaces of the planetary carrier 10 and the planet gear 8. Such frictional forces act to limit the differential function. It will be noted that both the internal gear 4 and the sun gear 6 are axially moveable, and accordingly, the thrusts produced are received by the washers 16A, 18A, 18B disposed between these gears and the planetary carrier 10 or by the washers 16B, 18C, 18D disposed between these gears and the case 14, producing frictional forces which also add to the differential limiting effect.

Figure 5:
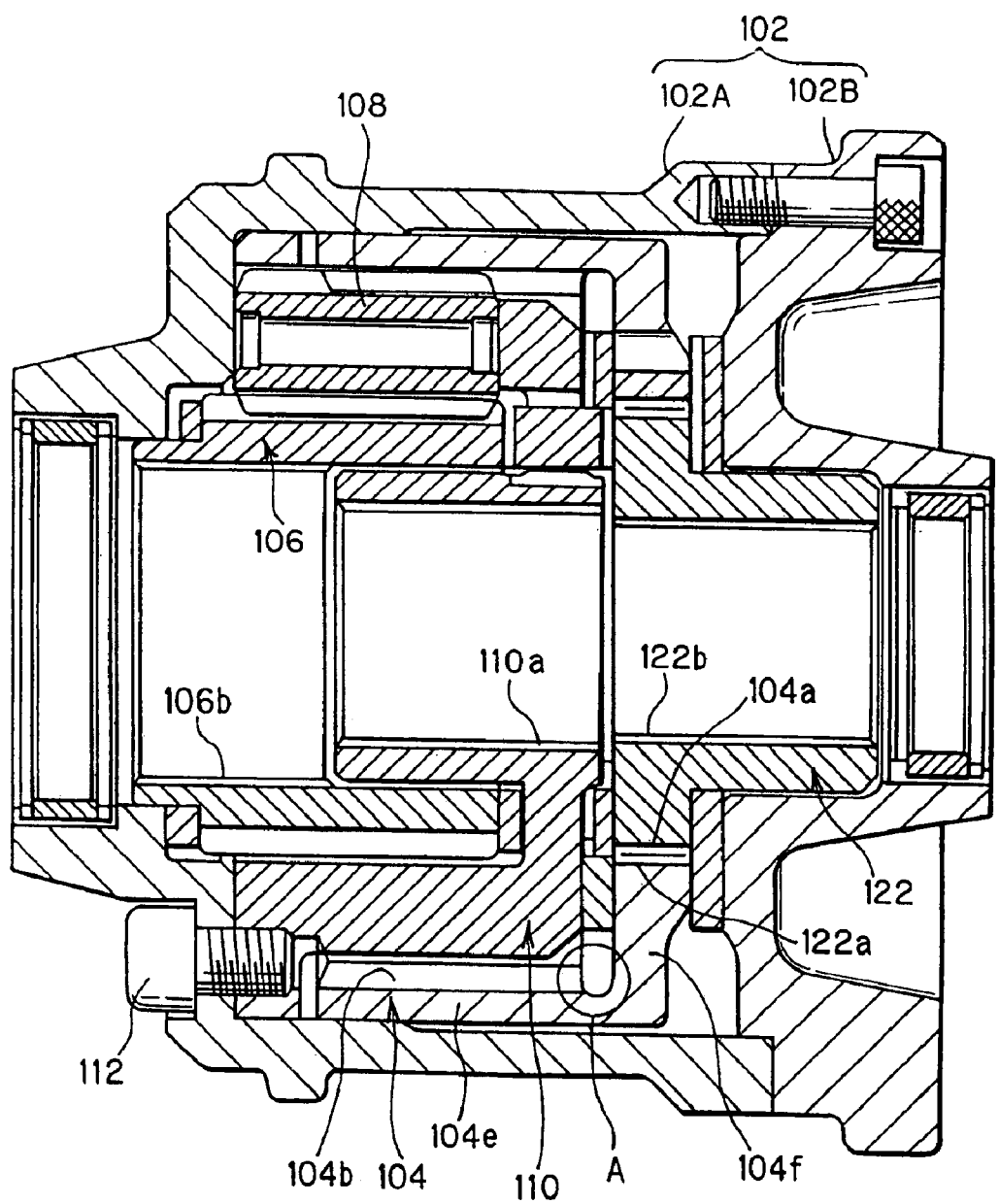
FIG. 5 is a longitudinal section of an example of a conventional differential gearing unit for vehicle.

The differential gearing unit for a vehicle according to the disclosed embodiment has the internal gear 4 which is molded by the plastic working as mentioned above, and the inner peripheral surface of the internal gear is formed with the internal teeth 4b except for the portion 4d which no teeth is formed while the spline groove 4a is formed in the outer peripheral surface only at the location which corresponds to the portion 4d where no internal teeth is formed for engagement with the spline groove 2a which is formed in the inner surface of the housing 2. Forming the internal gear 4 by the plastic working dispenses with the work grinding undercut (see region A shown in FIG. 5) which has been required in the conventional cutting operation used to form the internal gear. In this manner, the axial size of the internal gear 4 can be reduced to provide a compact product. In addition, the portion corresponding to the region A which has been required in the prior art can be provided in a greater thickness to improve the mechanical strength. In addition, the plastic working provides a work hardening of the material used for the gear itself, thus improving the strength and allowing the thickness to be reduced.

It will be seen that when the spline and the gear teeth, which are formed in the outer and the inner surface of the internal gear, overlap, thereby results a portion of a greatly reduced thickness, but in the present embodiment, the internal gear teeth 4b and the spline groove 4a on the outer surface are axially displaced from each other, thus preventing a portion of a greatly reduced thickness from being formed and allowing a sufficient strength to be assured for the gear region. In addition, the soft-nitriding, nitriding and carburizing hardening steps which follow the plastic working of the internal gear 4 improves the abrasion strength of the gear.

Figure 4:
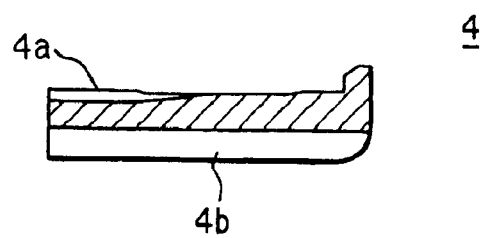
FIG. 4 is a cross section of an essential part of another example of the internal gear.

FIG. 4 shows another example of the internal gear 4 which is formed by the plastic working. In this example, the internal gear teeth 4b are formed along the entire axial length of the inner surface while the spline groove 4a on the outer surface is provided in the end region in the similar manner as in the first embodiment. Again, the size of the internal gear 4 can be reduced and the mechanical strength can be improved. In addition, the work hardening of the material through the plastic working improves the strength, thus allowing the thickness to be reduced.

While an input from the engine is applied to the planetary carrier 10 while the internal gear 4 and the sun gear 6 are connected to output members of the vehicle in the described embodiment, the invention is not limited to such an arrangement, but it should be understood that the input from the engine may be applied to any one of the planetary carrier 10, the internal gear 4 and the sun gear 6, while the remaining two may be connected to output shafts connected to the wheels.

What is claimed is:

1. A differential gearing unit for a vehicle including a cylindrically-shaped internal gear, a sun gear disposed inside the internal gear concentrically therewith, planet gears disposed between the internal gear and the sun gear in meshing engagement therewith for transmitting torques, and a planetary carrier for carrying the planet gears so as to be capable of revolving around an axis of the sun gear and on their own axes, the internal gear being molded by a plastic working and including an internal gear tooth formed on the inner peripheral surface and a spline groove formed on the outer peripheral surface which are axially separated from each other.

2. A differential gearing unit for a vehicle according to claim 1 in which the spline groove on the outer peripheral surface of the internal gear is effective to transmit an input and/or an output.

3. A differential gearing unit for a vehicle according to claim 1 in which a drive from an engine is input to one of the internal gear, the sun gear and the planetary carrier while one of the remaining two is connected to the front wheels and the other of the remaining two is connected to the rear wheels of a four-wheel driven vehicle.

4. A differential gearing unit for a vehicle including an internal gear, a sun gear disposed inside the internal gear concentrically therewith, planet gears disposed between the internal gear and the sun gear in meshing engagement therewith for transmitting torques, and a planetary carrier for carrying the planet gears so as to be capable of revolving around an axis of the sun gear and on their own axes, the sun gear being disposed inside the planetary carrier so as to be axially moveable, the internal gear being molded by a plastic working and including an internal gear tooth formed on the inner peripheral surface and a spline groove formed on the outer peripheral surface which are axially separated from each other.

* * * * *